United States Patent Office 3,518,076
Patented June 30, 1970

3,518,076
METHOD OF ELIMINATING WEED SPECIES WITH HERBICIDAL COMBINATION
William L. Wright, Greenfield, Ind., assignor to Eli Lilly and Company, Indianapolis, Ind., a corporation of Indiana
No Drawing. Filed May 17, 1967, Ser. No. 639,048
Int. Cl. A01n 9/14, 9/20
U.S. Cl. 71—111       3 Claims

ABSTRACT OF THE DISCLOSURE

A combination containing an N,N-dialkyl-2,6-dinitroaniline and isopropyl N-phenylcarbamate or isopropyl N-3-chlorophenylcarbamate eliminates virtually all grass weeds and broadleaf weeds from crop-growing areas when applied pre-emergence.

BACKGROUND OF THE INVENTION

According to U.S. Pat. 3,257,190, N,N-dialkyl-2,6-dinitroanilines are extremely effective pre-emergence herbicides for grass weeds and for a number of genera of broadleaf weeds. The compounds do not affect the growth of many crop plants, particularly cotton and soybeans, when applied to the crop-growing area either pre-emergence or post-emergence to the crop. Isopropyl N-3-chlorophenylcarbamate is an efficient herbicide for selected classes of broadleaf weeds. Neither herbicide is particularly effective in controlling weeds such as Colorado grass, nightshade, smartweed and pigweed.

SUMMARY

This invention provides a process for eliminating virtually all weed species from crop-growing areas comprising the application to an area infested with weed seeds of from 0.5 to 1.5 pounds per acre of a dinitroaniline, represented by Formula I below

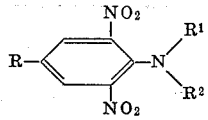

in combination with from 2 to 3 pounds per acre of isopropyl N-3-chlorophenylcarbamate or of isopropyl N-phenylcarbamate. In Formula I, $R^1$ and $R^2$ are the same or different members of the group consisting of ethyl, n-propyl, and n-butyl, and R is hydrogen, $C_1$–$C_3$ alkyl, halo having an atomic weight below 85, halo-substituted $C_1$–$C_3$ alkyl wherein halo has an atomic weight below 85, $C_1$–$C_3$ alkylsulfonyl, sulfonamido and cyano. Illustrative groups which R can represent include, therefore, chloro, bromo, fluoro, methyl, ethyl, n-propyl, isopropyl, sulfonamido ($NH_2$–$SO_2$), trifluoromethyl, pentafluoroethyl, heptafluoro-n-propyl, methylsulfonyl, ethylsulfonyl, n-propylsulfonyl, chloromethyl, dichloromethyl, β-bromoethyl and the like groups.

Illustrative compounds coming within the scope of Formula I above include the following:

N,N-di-n-propyl-4-bromoethyl-2,6-dinitroaniline
N,N-di-ethyl-4-chloromethyl-2,6-dinitroaniline
N,N-di-n-butyl-4-chloro-2,6-dinitroaniline
N,n-butyl-N-ethyl-4-fluoro-2,6-dinitroaniline
N,N-di-n-propyl-2,6-dinitroaniline
N,N-di-n-propyl-4-bromo-2,6-dinitroaniline
N,N-di-n-propyl-4-methyl-2,6-dinitroaniline
N,N-di-ethyl-4-heptafluoro-n-propyl-2,6-dinitroaniline
N-ethyl-N-n-propyl-2,6-dinitro-4-sulfonamidoaniline
N,N-di-ethyl-2,6-dinitro-4-n-propylaniline
N-ethyl-N-n-propyl-4-trifluoromethyl-2,6-dinitroaniline
N-n-butyl-N-ethyl-4-trifluoromethyl-2,6-dinitroaniline
N,N-di-ethyl-2,6-dinitro-4-sulfonamidoaniline
N-n-propyl-N-n-butyl-4-cyano-2,6-dinitroaniline
N,N-di-n-butyl-4-methyl-2,6-dinitroaniline
N,N-di-ethyl-4-methylsulfonyl-2,6-dinitroaniline
N,N-di-n-propyl-2,6-dinitro-4-n-propylsulfonylaniline For use in the processes of my invention, one or more compounds represented by Formula I above and isopropyl N-3-chlorophenylcarbamate (to be referred to hereinafter as CIPC) or isopropyl N-phenylcarbamate (to be referred to hereinafter as IPC) or mixtures thereof are formulated together as emulsifiable concentrates, spreadable dusts or wettable powders. Typical formulations suitable for use in my novel process are the following:

EMULSIFIABLE CONCENTRATES (A)

|  | Percent |
|---|---|
| N,N - di - n - propyl - 4-trifluoromethyl-2,6-dinitroaniline | 11.8 |
| Xylene | 32.4 |
| CIPC | 46.2 |
| Combination of anionic and non-ionic surfactants | 9.6 |

(B)

|  | |
|---|---|
| N-n-butyl-N-ethyl-4 - trifluoromethyl - 2,6 - dinitroaniline | 12.2 |
| Xylene | 42.7 |
| CIPC | 35.5 |
| Combination of anionic and non-ionic surfactants | 9.6 |

IPC can be formulated with a 2,6-dinitroaniline herbicide in the same way as CIPC.

Suitable emulsifiers and surfactants for use in the above formulations include non-ionics of the alkylphenol polyoxyalkylene ether type, such as a nonylphenol polyoxyethylene ether containing 13 oxyethylene residues, as well as ethoxylated polyol fatty acid esters such as a polyoxyethylene ester of stearic acid having 9 oxyethylene residues in the polyoxyethylene moiety. Suitable anionic emulsifiers include such compounds as the metal salts of alkylaryl sulfonates, including the magnesium, calcium, strontium, sodium, and aluminum salts; for example, calcium isobutylbenzenesulfonate, magnesium octylbenzenesulfonate, calcium myristylbenzenesulfonate, and strontium laurylbenzenesulfonate.

My novel herbicidal combinations, when formulated as emulsifiable concentrates, can be diluted with water and sprayed on the crop-growing area in liquid form. On the other hand, if a herbicidal dust formulation is to be used, it can be applied to the crop-growing area either as such or mixed with fertilizer. The herbicidal combination, however formulated or diluted, is applied to the crop-growing area at such a rate that from 0.5 to 1.5 pounds of a dinitroaniline represented by Formula I and from 2 to 3 pounds of CIPC or of IPC are applied per acre.

In applying the herbicidal combinations of this invention pre-emergence to the areas to be planted to crops, it is preferable that the herbicide be sprayed onto the soil area in the form of an emulsion, prepared by diluting an emulsifiable concentrate, and then soil incorporated with a power driven rotary hoe to depths of about 2–3 inches in a typical clay-loam soil.

The combinations useful in this invention, when properly formulated and applied, provide excellent broad-spectrum weed control at application rates lower than would be required for comparable weed control with either herbicide alone. For example, a combination of 0.5 pound per acre of N,N-di-n-propyl-4-trifluoromethyl-2,6-dinitroaniline (to be referred to hereinafter as trifluralin) with 2 pounds per acre of CIPC produces weed control superior to that obtainable with either 0.5 pound per acre of trifluralin or with 2 pounds per acre of CIPC alone.

In addition, combinations such as the above eliminate a far broader spectrum of weeds than either of the ingredients will eliminate by itself at the same rate of application as in the combination, although the herbicidal spectrum depends both upon the application rate and the proportion of the ingredients in the combination. The application rate depends, in turn, upon the type of soil involved, lower rates being suitable for sandy soils and higher rates for medium and heavy clay loams.

Among the weeds which can be eliminated from a crop-growing area by application thereto of the above two herbicides in combination in the amounts specified are included species of the genus Digitaria, such as crabgrass; Setaria, such as green and yellow foxtail; Sorghum, such as Johnson grass; Eleusine, such as goosegrass; Ceenchru, such as sandbur; Panicum, such as witchgrass and Texas panicum; Amaranthus, such as pigweed; Polygonum, such as smartweed; Chenopodium, such as lamb's-quarter; Stellaria, such as chickweed; Mollugo, such as carpetweed; Salsola, such as Russian thistle; and Cyperus, such as nutsedge; as well as species within the genera Kochia, Galinsoga, and Portulaca.

The novel combinations of this invention are particularly valuable for the control of weeds in dry beans and direct-seeded lettuce.

To further illustrate the herbicidal effectiveness of the combinations of this invention, an application of 0.5 pound per acre of trifluralin in combination with 2 pounds per acre of CIPC gave control of watergrass comparable to that obtained with 0.75 to 1 pound per acre of trifluralin alone. CIPC does not control watergrass at all at an application rate of 2 pounds per acre and only slightly at an application rate of 4 pounds per acre. In this experiment, the herbicidal combination was soil incorporated pre-emergence to both weeds and crops. Injury to dry beans, variety blackeye, was only slight and the yield from the area treated with the above herbicidal combination was 3 times that obtained in the control area with no herbicide applied. It can be seen from the above results that a combination of trifluralin and CIPC operates synergistically to control watergrass in that CIPC itself is without activity against watergrass in the amount employed in the novel combination.

The same combination of trifluralin and CIPC is also extremely effective in controlling nightshade. Table I below gives the results of an experiment designed to test the degree of control of nightshade in an area to be planted to dry beans, variety blackeye, where the herbicidal combination was soil incorporated pre-emergence to both weeds and crops. In the table, column 1 gives the amount of trifluarlin applied per acre, column 2 the amount of CIPC applied per acre, column 3 percent weed control about 1 month after planting and column 4 percent weed control about 2 months after planting.

TABLE I

| Trifluralin (lb./a.) | CIPC (lb./a.) | Percent weed control [1] | |
|---|---|---|---|
| | | 1 mo. | 2 mo. |
| 0.5 | 2 | 9.6 | 80 |
| 0.75 | 3 | 9.5 | 88 |
| 1.0 | 0 | 9.6 | 57 |
| 0 | 2 | 4.0 | 63 |
| 0 | 4 | 5.0 | 51 |

[1] Weed control rating is based on a scale where 0=0 percent control and 10=100 percent control.

A similar field trial was carried out employing pre-plant incorporation of herbicidal combinations containing either trifluarlin and CIPC or N-n-butyl-N-ethyl-4-trifluoromethyl-2,6-dinitroaniline (to be referred to hereinafter as benefin) and CIPC in an area later seeded to dry beans, variety pinto (pre-emergence to both crops and weeds). In this field trial, the effectiveness of the herbicidal combination against Colorado grass was determined. Table II which follows gives the results of this field trial. In the table, columns 1, 2 and 3 give the amounts of trifluralin, benefin, and CIPC, respectively, employed and column 5 the percent control of Colorado grass.

TABLE II

| Trifluralin (lb./a.) | Benefin (lb./a.) | CIPC (lb./a.) | Percent control Colorado grass |
|---|---|---|---|
| 0.5 | 0 | 2 | 93 |
| 0 | 1 | 2 | 99 |
| 0.5 | 0 | 0 | 88 |
| 0 | 1 | 0 | 95 |
| 0 | 0 | 2 | 60 |

It is apparent that the combinations were in each instance more effective than any single herbicide at the same application rate.

Another field trial which demonstrated the increased effectiveness of combinations of trifluralin or benefin with CIPC against weed grasses was carried out by first soil incorporating the herbicidal combination one month before planting (pre-emergence to both weeds and crops). The field was planted to dry beans, variety pinto. The field was inspected at one and two months after planting to determine the degree of control of Colorado grass and foxtail (both of which were prevalent in the control plots). Table III which follows gives the results of this particular field trial. In the table, columns 1, 2 and 3 give the amount of trifluralin, benefin and CIPC, respectively, employed as herbicides and columns 4 and 5 the percent grass control one month and 3 months after planting the crops.

TABLE III

| Trifluralin (lb./a.) | Benefin (lb./a.) | CIPC (lb./a.) | Percent grass control | |
|---|---|---|---|---|
| | | | 1 mo. | 3 mo. |
| 0.5 | 0 | 2.0 | 93 | 95 |
| 0 | .75 | 1.5 | 93 | 97 |
| 0.5 | 0 | 0 | 88 | 84 |
| 0 | .75 | 0 | 94 | 73 |
| 0 | 0 | 2.0 | 60 | 78 |

Again, the above results show the superior weed control obtained by use of herbicidal combinations containing a dinitroaniline plus CIPC over the results obtained with either herbicide alone.

Further field trials of novel combinations of herbicides coming within the scope of this invention have shown that 0.5 pound per acre of trifluralin plus 2 pounds of CIPC gave excellent control of black nightshade, and 0.75 pound of trifluralin in combination with 3 pounds of CIPC not only gave virtually complete control of black nightshade, but also completely eliminated Canada thistle from the treated area. One-half pound per acre of benefin in combination with 1.5 pounds of CIPC gave excellent control of sandbur and cocklebur.

In all of the above trials, IPC could have been substituted for all or part of the CIPC with substantially the same results.

In addition to the superior weed control by use of the processes of this invention, it has frequently been found that the yield of the crop from the area treated with one of my novel combinations is increased over the yield in a similar untreated area. It has not been possible to determine whether this increase in yield is due entirely to the absence of weeds in the area, and therefore to the absence of plants which are competitive with the crop plant for soil nutrients, or whether some more subtle effect is involved.

I claim:

1. A method of eliminating virtually all weed species from a crop-growing area infested with weed seeds which comprises applying to said area 0.5 to 1.5 pounds per acre of a dinitroaniline of the formula

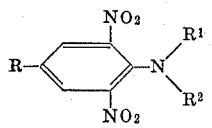

wherein $R^1$ and $R^2$ are the same or different members of the group consisting of ethyl, n-propyl, and n-butyl and R is hydrogen, $C_1$–$C_3$ alkyl, halo having an atomic weight below 85, halo-substituted $C_1$–$C_3$ alkyl wherein halo has an atomic weight below 85, $C_1$–$C_3$ alkylsulfonyl sulfonamido and cyano;
  in combination with from 2 to 3 pounds per acre of isopropyl N-3-chlorophenylcarbamate or of isopropyl N-phenylcarbamate.

2. The method according to claim 1 wherein a dinitroaniline, N,N-di-n-propyl-4-trifluoromethyl-2,6-dinitroaniline, is combined with isopropyl N-3-chlorophenylcarbamate.

3. The method according to claim 1 wherein a dinitroaniline, N-n-butyl-N-ethyl-4-trifluoromethyl-2,6-dinitroaniline, is combined with isopropyl N-3-chlorophenylcarbamate.

References Cited
UNITED STATES PATENTS

| 3,403,180 | 9/1968 | Soper | 71—121 X |
|---|---|---|---|
| 3,449,111 | 6/1969 | Wright | 71—121 X |

OTHER REFERENCES

Danielson: Proceedings of Northeastern Weed Control Conference, vol. 20, p. 93 (1966).

Gentner et al.: Proceedings of Northeastern Weed Control Conference, vol. 20, p. 317 (1966).

JAMES O. THOMAS, JR., Primary Examiner

U.S. Cl. X.R.

71—103, 121